(12) United States Patent
Donovan

(10) Patent No.: US 11,225,181 B2
(45) Date of Patent: Jan. 18, 2022

(54) RESIN FUSES AND VEHICLES COMPRISING THE SAME

(71) Applicant: Toyota Motor Engineering & Manufacturing North America, Inc., Plano, TX (US)

(72) Inventor: Gregory T. Donovan, Britton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 842 days.

(21) Appl. No.: 16/050,502

(22) Filed: Jul. 31, 2018

(65) Prior Publication Data

US 2020/0039408 A1 Feb. 6, 2020

(51) Int. Cl.
| | |
|---|---|
| B60N 2/427 | (2006.01) |
| B60N 2/90 | (2018.01) |
| B60N 2/20 | (2006.01) |
| B60N 2/64 | (2006.01) |
| G01L 1/06 | (2006.01) |
| F16F 7/12 | (2006.01) |

(52) U.S. Cl.
CPC ............... B60N 2/90 (2018.02); B60N 2/20 (2013.01); B60N 2/42709 (2013.01); B60N 2/64 (2013.01); F16F 7/12 (2013.01); G01L 1/06 (2013.01); B60N 2002/981 (2018.02); F16F 2224/0233 (2013.01); F16F 2230/0047 (2013.01)

(58) Field of Classification Search
CPC ............................. B60N 2/42709; B60N 2/90
See application file for complete search history.

(56) References Cited

U.S. PATENT DOCUMENTS

| | | | |
|---|---|---|---|
| 6,356,200 B1 | 3/2002 | Hamada et al. | |
| 10,161,469 B1 * | 12/2018 | Bosen | F16F 7/123 |
| 2012/0319442 A1 * | 12/2012 | Clement | B60N 2/2821 |
| | | | 297/216.11 |

FOREIGN PATENT DOCUMENTS

| | | | | |
|---|---|---|---|---|
| DE | 19807581 A1 * | 9/1998 | ......... | B60N 2/42709 |
| DE | 102016217405 B3 * | 1/2018 | ......... | B60N 2/42745 |
| EP | 1547857 A2 * | 6/2005 | ......... | B60N 2/42745 |
| JP | 2009128153 A | 6/2009 | | |
| JP | 2012176647 A | 9/2012 | | |
| JP | 5887875 B2 | 3/2016 | | |
| JP | 2016137825 A | 8/2016 | | |
| WO | WO-2008149043 A2 * | 12/2008 | ........... | B60N 2/4228 |
| WO | WO-2013042550 A1 * | 3/2013 | ......... | B60N 2/42709 |

* cited by examiner

*Primary Examiner* — Timothy J Brindley
(74) *Attorney, Agent, or Firm* — Dinsmore & Shohl LLP

(57) ABSTRACT

A vehicle seat assembly including a seat frame assembly including a seat base and a seat back pivotally connected to the seat base. The seat back includes at least one resin fuse arranged in the seat back to indicate structural loading in the vehicle seat assembly above a tolerance loading. The at least one resin fuse includes an aperture extending through the seat back and comprising a flange encircling the aperture and extending generally perpendicular to the seat back, and an indicator bar extending across a diameter of the aperture. The aperture is open on either side of the indicator bar.

20 Claims, 7 Drawing Sheets

RESIN FUSES AND VEHICLES COMPRISING THE SAME

TECHNICAL FIELD

The present specification generally relates to methods and devices for determining the structural integrity of automobile components and, more specifically, to methods and devices for determining the structural integrity of seat assemblies in vehicles, such as automobiles.

BACKGROUND

Automobiles may include seat assemblies including structural components that may yield or otherwise experience deformation when loaded. Some components may experience plastic deformation and/or cracking when loaded above a predetermined loading tolerance. In such an event, replacement of one or more parts or an entire component may be required. In some instances, this plastic deformation may be invisible to the naked eye and undetectable upon routine visual inspection (e.g., such as when the component contains hairline fractures and/or microfractures that are not perceptible to the unaided eye). Such hairline fractures and/or microfractures may critically reduce the loading tolerance of the vehicle seat assembly.

Accordingly, a need exists for alternative devices for assessing the structural integrity of vehicle components.

SUMMARY

In one embodiment, a vehicle seat assembly includes a seat frame assembly including a seat base and a seat back pivotally connected to the seat base, the seat back comprising at least one resin fuse arranged in the seat back to indicate structural loading in the vehicle seat assembly above a tolerance loading. The at least one resin fuse comprises an aperture extending through the seat back and comprising a flange encircling the aperture and extending generally perpendicular to the seat back and an indicator bar extending across a diameter of the aperture. The aperture is open on either side of the indicator bar.

In another embodiment, a vehicle includes a vehicle seat assembly and the vehicle seat assembly includes a seat back including at least one resin fuse arranged in the seat back to indicate structural loading in the vehicle seat assembly above a tolerance loading. The at least one resin fuse includes an aperture extending through the seat back and comprising a flange encircling the aperture and extending generally perpendicular to the seat back, and an indicator bar extending across a diameter of the aperture. The aperture is open on either side of the indicator bar.

In yet another embodiment, a method of inspecting a vehicle seat is described. The vehicle seat includes a seat back with at least one resin fuse including an aperture extending through the seat back that is encircled by a flange and an indicator bar extending across a diameter of the aperture between two openings of the aperture. The method includes inspecting the indicator bar for discontinuities in the indicator bar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
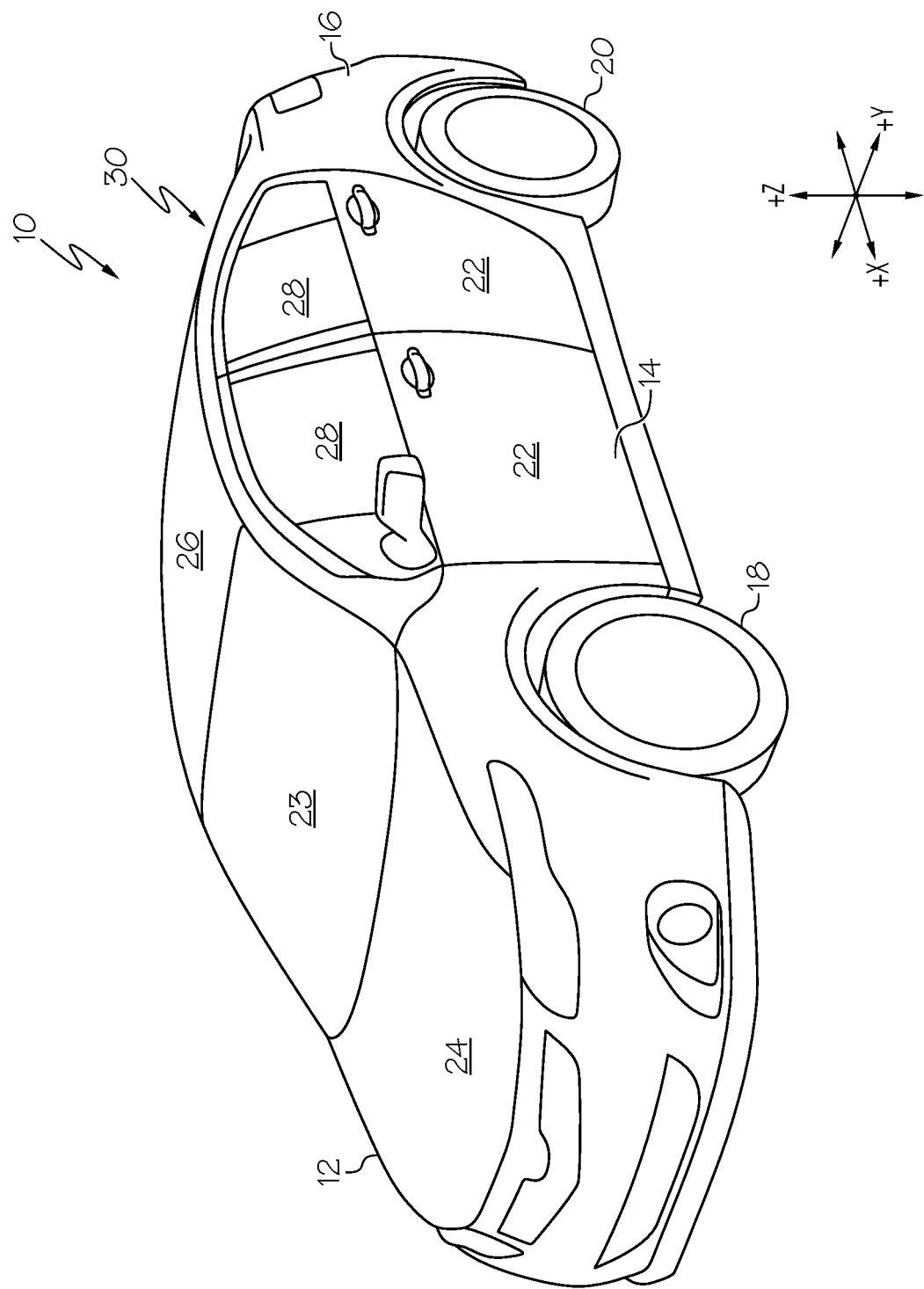
FIG. 1 depicts an illustrative vehicle that includes a vehicle seat assembly including at least one resin fuse for determining the structural integrity of the vehicle seat assembly, according to one or more embodiments shown and described herein.

Vehicles may include one or more components made of resin. For example, and without limitation, a vehicle may include a vehicle seat assembly with one or more components of the vehicle seat assembly made from resin. The vehicle seat assembly may include a seat frame assembly that includes a seat base and a seat back pivotally connected to the seat base. The seat back may include at least one resin fuse arranged in the seat back to indicate structural loading in the vehicle seat assembly above a tolerance loading. The at least one resin fuse may include an aperture extending through the seat back and comprising a flange encircling the aperture and extending generally perpendicular to the seat back. The at least one resin fuse may also include an indicator bar extending across a diameter of the aperture. The aperture may be open on either side of the indicator bar.

Components of the vehicle may be formed from resin for a number of reasons. For example, resin fiber may be relatively less expensive to produce and to use to manufacture portions of vehicles or vehicle components as compared with metals, such as steel or aluminum. Additionally, components made from resin may weigh less than corresponding components made from metals such as steel or aluminum and thus resin may be a viable constituent for reducing the overall weight of a vehicle. Reducing vehicle weight may increase speed, handling, and fuel efficiency. Based on its relatively low cost and weight, resin may be increasingly used in the manufacture of vehicles and vehicle components. For example, one or more components of a vehicle seat may be manufactured from resin.

The use of resin in vehicle seats and other vehicle components may encompass particular advantages, for example resin can be relatively light compared with other material such as metals like aluminum or steel. In the aggregate, lighter components may have a significant effect on the efficiency of a vehicle. However, components made from resin may be less ductile than components made from other materials (e.g., metals) and may be more likely to experience brittle fracture without appreciable plastic deformation prior to fracture. Such brittle fracture may occur on a microscopic scale (i.e., hairline or microfractures) and may be difficult or impossible to detect without sophisticated inspection equipment. A component with hairline and/or microfractures may be more susceptible to macroscopic fractures when subjected to subsequent loading at or below the level of the initial fracture-causing load. Accordingly, in some instances, a resin component may require replacement because of hairline and/or microfractures but this status may be unknown to the user of the component because such microscopic fractures may be undetectable. Accordingly, a need exists for resin fuses that may provide a user immediate visual indication of the structural integrity of vehicle components made from resin such as vehicle seats and portions thereof.

Embodiments described herein are generally directed to vehicles, systems, and methods that provide immediate indication of loading above a loading tolerance in a vehicle seat assembly. The loading may be experienced by a vehicle and components thereof during, for example, collision testing of the vehicle. The vehicle may include a component comprising a body formed from a resin material. One exemplary embodiment of a component having a body formed from a resin material includes a vehicle seat assembly. The vehicle seat assembly may include at least one resin fuse that may form a discontinuity, fracture, or decouple upon experiencing a vehicle load above a designed loading tolerance. A disjoined or decoupled resin fuse may be indicative of the vehicle the vehicle component (e.g., the seat assembly) or portions thereof having exceeded a loading tolerance and/or that the component or components need to be replaced. The fracture tolerance of the resin fuse or portions thereof may be calibrated in relation to one or more characteristics of the vehicle and/or the resin component (e.g., the vehicle seat assembly), for example, based on the tolerance of the resin component for developing microscopic fractures after a collision test that may be undetectable using the naked eye. Accordingly, the resin fuses can provide an immediate indication to a user of an excessive loading condition and an indication as to the necessity for replacing the resin component (e.g., the vehicle seat assembly) or one or more components thereof.

As used herein, the term "vehicle longitudinal direction" refers to the forward-rearward direction of the vehicle (i.e., in the +/−vehicle X-direction as depicted). The term "vehicle lateral direction" refers to the cross-vehicle direction (i.e., in the +/−vehicle Y-direction as depicted), and is transverse to the vehicle longitudinal direction. The term "vehicle vertical direction" refers to the upward-downward direction of the vehicle (i.e., in the +/−vehicle Z-direction as depicted). Further, the terms "inboard" and "outboard" are used to describe the relative positioning of various components of the vehicle with respect to a centerline of the vehicle in the vehicle lateral direction.

Motor vehicles that incorporate elements according to the present disclosure may include a variety of construction methodologies that are conventionally known, including the unibody construction methodology as well as a body-on-frame construction methodology. While the embodiments of the present disclosure are described and depicted herein in reference to unibody construction, it should be understood that vehicles that are constructed with body-on-frame structures may incorporate the elements that are shown and described herein.

Referring now to FIG. 1, selected portions of an illustrative vehicle 10 are illustrated. The vehicle 10 includes a front section 12, a cabin 14, and a rear section 16. The front section 12 may include a pair of front wheels 18 and the rear section 16 may include a pair of rear wheels 20. The front wheels 18 and the rear wheels 20 may be mechanically coupled by a vehicle drivetrain. The cabin 14 may include four doors 22. As depicted in FIG. 1, the vehicle 10 is a sedan body style, but embodiments are not limited to this body style. It is contemplated that any vehicle body style, for example, a truck, an SUV, a van, or a coupe may include one or more vehicle seat assemblies as described herein. Moreover, although the seat assemblies are described herein with respect to an automobile, such features may be implemented in any type of vehicle, for example, a bus, boat, plane, train, wagon, or any other type of vehicle having one or more seat assemblies.

The front section 12 may include a hood 24 and the cabin 14 may include the roof 26. A windshield 23 may slope generally from the hood 24 to the roof 26. One or more windows 28 may be installed in each of the doors 22. A rear windshield 30 may slope generally from the roof 26 to a trunk 32 in the rear section of the vehicle 10.

The cabin 14 may include space for one or more passengers of the vehicle 10. The cabin 14 may also include one or more systems for operating the vehicle, for example, pedals, shifters, gauges, etc. for controlling the vehicle 10. The vehicle 10 may include one or more seat assemblies including seats for seating passengers of the vehicle 10 as will be described in greater detail herein.

Figure 2A:
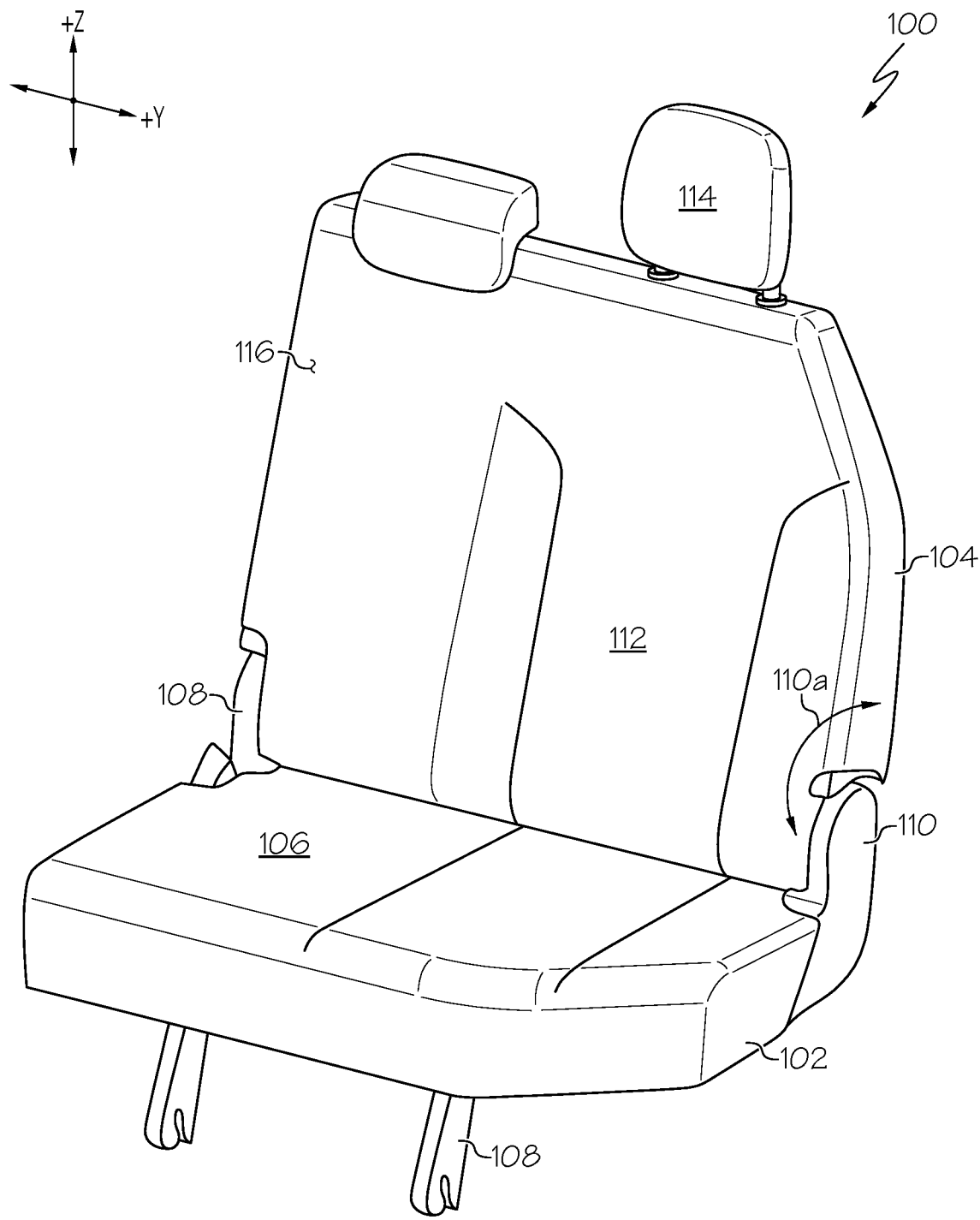
FIG. 2A depicts an illustrative vehicle seat assembly including a seat frame assembly that includes a seat cover and padding installed over a seat back and a seat base, according to one or more embodiments shown and described herein.

Referring now to FIG. 2A, an illustrative vehicle seat assembly 100 is shown. The particular example embodiment of the vehicle seat assembly 100 shown in FIG. 2A is a portion of a bench seat for the back of a vehicle having a 60/40 split rear bench seat, however, it is to be understood that the features and functions described with respect to the example embodiment shown in FIG. 2A could be implemented on other types of vehicle seats including, without limitation, bench seats and/or bucket seats. Additionally, while particular embodiments and applications of the resin fuse are described herein with respect to the vehicle seat assembly shown in FIG. 2A, it is to be understood that the features and components of the resin fuse and the application thereof, could be used with any resin component of a vehicle, and that use of resin fuses is not limited to vehicle seat assemblies, but could be applied, for example, and without limitation, in any other vehicle component formed from resin, for example, consoles, dash boards, door panels, etc.

The vehicle seat assembly 100 includes a seat base 102 and a seat back 104. The seat base 102 may include one or more seats 106 and one or more connections 108 for mechanically coupling the vehicle seat assembly 100 to the vehicle 10. The seat base 102 also includes a recline mechanism 110 for moveably connecting the seat base 102 with the seat back 104. For example, the seat back 104 may pivot or rotate about the recline mechanism 110 as indicated by double arrow 110a.

The seat back 104 may include a back rest 112 and a head rest 114. In some embodiments, the seat back 104 may include more than one head rest 114. In embodiments, the seat back 104, the seat base 102, or both may include various vehicle seat accessories, for example, a seat belt connection, a cup holder, an armrest, a lumbar support, or other accessories.

In some embodiments, the recline mechanism 110 may allow the seat back 104 to move (i.e., rotate or pivot) relative to the seat base 102 to a variety of angular positions relative thereto. The seat back 104 may be releasably locked into place at a desired location via manual or automatic operation. The head rest 114 may be adjustable to a variety of positions in the vehicle-vertical direction (+/−Z) relative to the seat back 104 in the vehicle vertical direction and be releasably locked into place at a desired location via manual and/or automatic operation. While the vehicle seat assembly 100 is illustrated as a rear passenger seat, the vehicle seat may be provided at other occupant positions, such as one or more front and/or rear passenger seats and/or a driver seat.

The vehicle seat assembly 100 may include a seat cover 116. The seat cover 116 may be upholstery such as leather, cloth, etc. The seat cover 116 may enclose a seat cushion made from high-density foam or some other relatively soft material, such as plastic, foam, rubber, or other soft material.

Figure 2B:
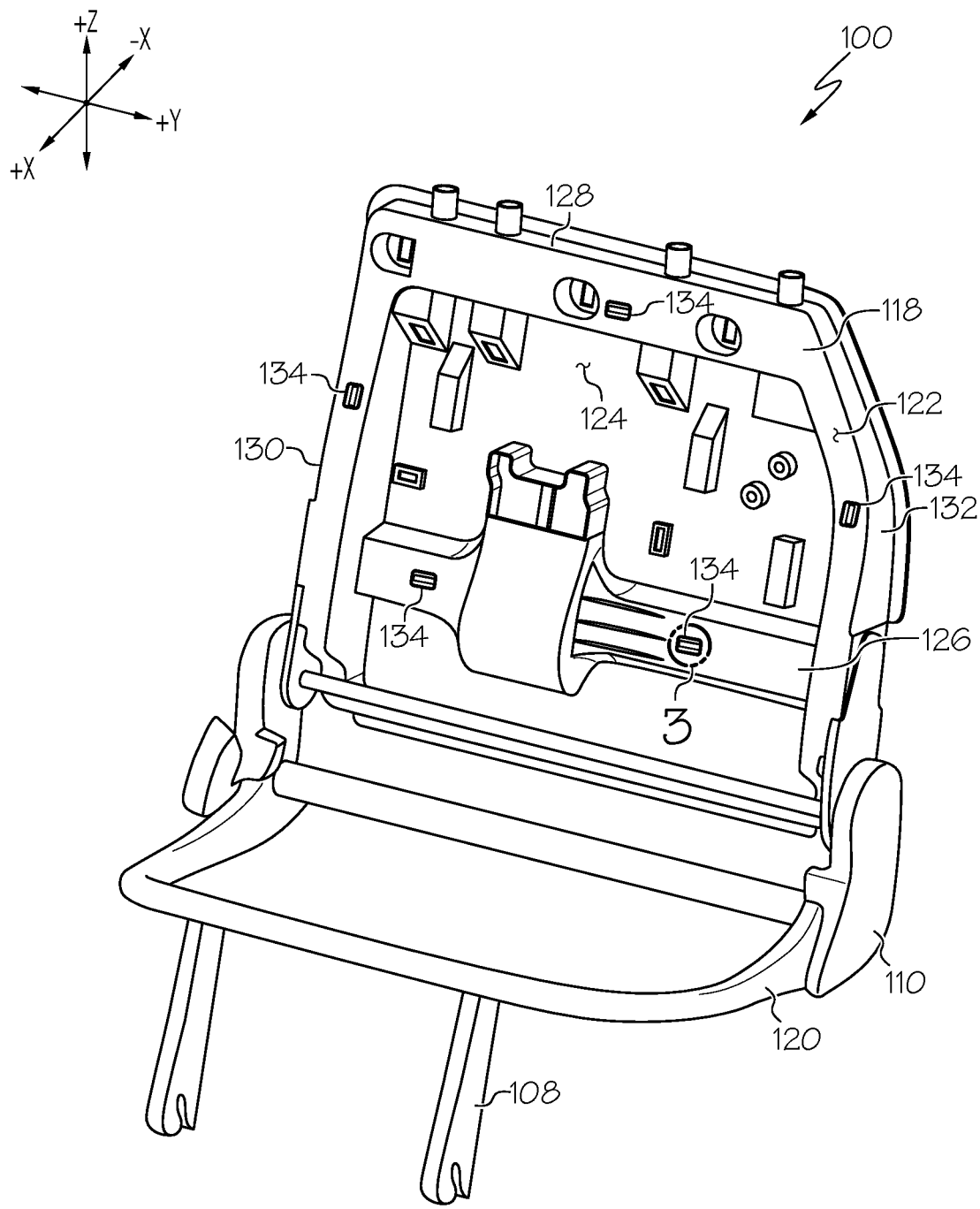
FIG. 2B depicts the vehicle seat assembly of FIG. 2A with the seat cover and the padding removed revealing at least one resin fuse for determining the structural integrity of the vehicle seat assembly, according to one or more embodiments shown and described herein.

FIG. 2B depicts the vehicle seat assembly 100 of FIG. 2A without upholstery or padding. FIG. 2B shows a resin seat back 118 coupled to a base frame 120 at the recline mechanism 110. The resin seat back 118 extends laterally in the vehicle-lateral direction (+/−Y) and upwards from the base frame 120 in a vehicle-vertical direction (+/−Z). The base frame 120 extends horizontally in the vehicle-lateral direction (+/−Y) and in the vehicle-longitudinal direction (+/−X). The base frame 120 may comprise steel, aluminum, or some other metal. In other embodiments, the base frame may comprise a resin, similar to the resin seat back 118.

In embodiments, the resin seat back 118 may partially or completely comprise a resin. For example, the resin seat back 118 may comprise any material containing a thermoplastic or thermoset resin, for example polyester resin, polyethylene (PE), polypropylene (PP), polyurethanes, epoxy resins, or the like. The resin seat back 118 may comprise a forward panel 122, a base panel 124, and a cross panel 126. The forward panel 122 may generally extend between a top 128, a first side 130, and a second side 132 of the resin seat back 118. The base panel 124 may generally form a plane that extends in the vehicle-lateral (+/−Y) and vehicle-vertical (+/−Z) directions. The cross panel 126 may be generally planar and extend between opposite sides of the forward panel 122.

Still referring to FIG. 2B, the vehicle seat assembly 100 may include at least one resin fuse 134. The resin fuse 134 may indicate structural loading above a tolerance level as will be described in greater detail herein. In some embodiments, the vehicle seat assembly 100 may include an arrangement of resin fuses 134 and the resin fuses 134 may be arranged in various configurations on the seat back 104. For example, the resin fuses 134 may be arranged with one or more resin fuses 134 in a vehicle-vertical direction and/or one or more fuses in a vehicle-horizontal direction.

As depicted in the particular example embodiment shown in FIG. 2B, there are three resin fuses 134 on the forward panel. The three resin fuses 134 on the forward panel 122 are arranged in both a vehicle-horizontal and vehicle-vertical directions. Additionally, there are two resin fuses 134 on the cross panel 126. Both resin fuses 134 on the cross panel 126 are shown in a vehicle-horizontal orientation. However, embodiments are not limited to this number, location, and/or arrangement of the resin fuses 134. It is contemplated that the resin fuses may be arranged in any number, location, and/or orientation. For example, in some embodiments, one or more of the resin fuses 134 may have a diagonal orientation with respect to the vehicle-vertical and vehicle-lateral directions. Additionally, none of the resin fuses shown in the particular example embodiment depicted in FIG. 2B are arranged in a vehicle-longitudinal direction, however, it is contemplated that one or more arrangements of resin fuses 134 in the vehicle 10 may include resin fuses 134 in a vehicle-longitudinal orientation through a thickness of one or more portions of the resin seat back 118.

Figure 3:
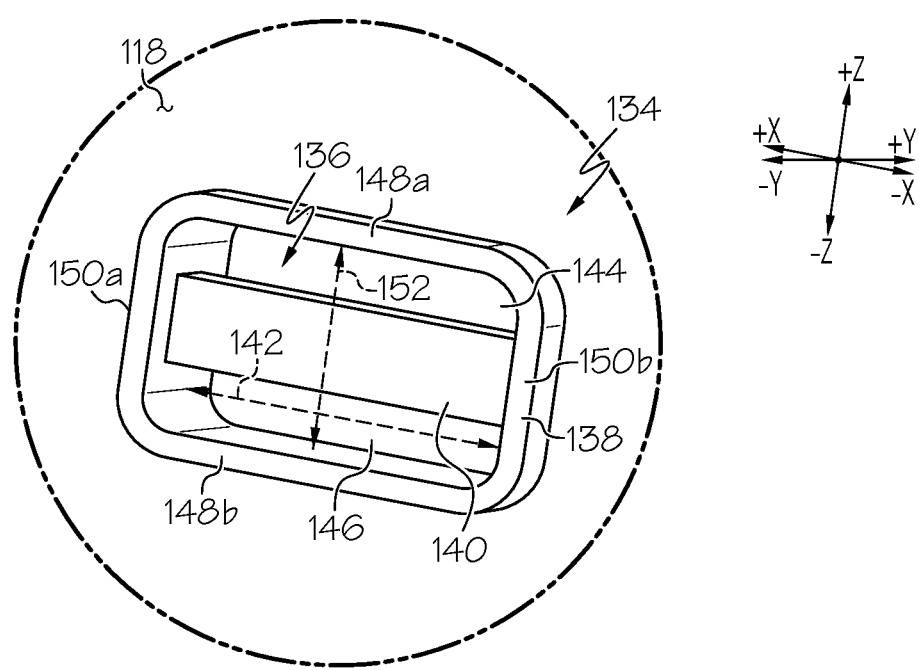
FIG. 3 depicts an illustrative resin fuse of the seat back of FIG. 2B in isolation, according to one or more embodiments shown and described herein.

Turning now to FIG. 3, the resin fuse 134 includes an aperture 136 extending through the resin seat back 118. The resin fuse 134 also includes a flange 138 encircling the aperture 136 and an indicator bar 140. In some embodiments, the aperture 136 may extend through an entire thickness of the resin seat back 118. In other embodiments, the aperture 136 may extend through only a partial thickness of the resin seat back 118.

The flange 138 may extend generally perpendicular to the resin seat back 118 in the vehicle-longitudinal direction. In some embodiments, the flange 138 may extend forward and rearward from the resin seat back 118. In other embodiments, one or more portions of the flange 138 may be flush with a forward or a rear surface of the resin seat back 118. In some embodiments, such as that shown in FIG. 3, the flange may form a generally rectangular shape with a first pair of opposing sidewalls 148a, 148b and a second pair of opposing sidewalls 150a, 150b. However, it should be understood that the flange may take on other shapes including, without limitation, circles, squares, rectangles and the like. The first pair of opposing sidewalls 148a, 148b may be generally perpendicular to the second pair of opposing sidewalls 150a, 150b. The flange 138 may extend outward from the resin seat back 118 in the vehicle-longitudinal direction (+/−X).

The aperture 136 may include a height dimension 152. The indicator bar 140 may extend across a diameter 142 of the aperture 136. In embodiments, the aperture 136 is open on either side of the indicator bar 140. That is, the aperture 136 may comprise a top opening 144 above the indicator bar 140 and a bottom opening 146 below the indicator bar 140. In some embodiments, the indicator bar 140 has a uniform width and thickness across the diameter 142 of the aperture 136. In some other embodiments, the indicator bar 140 may optionally include one or more features that cause the indicator bar 140 to break, dislodge, snap, fracture, or otherwise form a discontinuity in the indicator bar 140, thereby physically relating the strength of the indicator bar 140 to the loading tolerance of the resin seat back 118 for developing micro-fractures as will be described in greater detail herein.

In some embodiments, the resin fuse 134 may be integrally formed with the resin seat back 118. In such embodiments, the resin fuse 134 including the indicator bar 140 may be formed (i.e., manufactured) at the same time or during the same process of manufacture. In such embodiments, the resin seat back 118 may be installed to the vehicle seat assembly 100 and include all of the resin fuses 134 that will be placed in the resin seat back 118 at the time of installation. In other embodiments, one or more of the resin fuses 134 may be removable elements from the resin seat back 118 and may be uninstalled, reinstalled, replaced, etc. without removing and/or replacing the resin seat back 118. In such embodiments, one or more components of the resin fuses 134 may be configured to be removed from the resin fuse 134. For example, the indicator bar 140 may be configured to be removed from the resin fuse 134 and replaced, for example, if it is broken or if another resin fuse 134 in the seat back 104 has a broken indicator bar 140 as will be described in greater detail herein.

In other embodiments, the resin fuse 134 may be formed separately from the resin seat back 118 and installed into the aperture 136 in the resin seat back 118 during installation of the vehicle seat assembly 100.

In some embodiments, the height 152 of the aperture 136 may be constant across the diameter 142 of the aperture 136. In some embodiments, the diameter 142 of the aperture 136 may be constant along the height 152 of the aperture 136. However, it is contemplated that embodiments may include apertures 136 including one or more varying dimensions, for example, the height 152 of the aperture 136 may vary and/or the diameter 142 of the aperture 136 may vary.

Figure 4A:
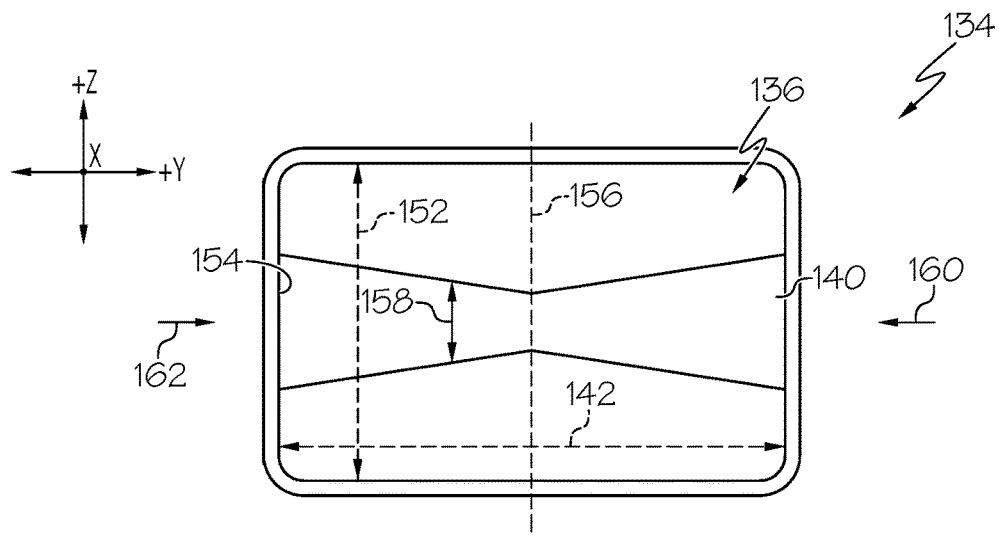
FIG. 4A depicts a front view of another embodiment of the resin fuse of FIG. 3, according to one or more embodiments shown and described herein.

FIG. 4A depicts a front (i.e., as seen in the vehicle longitudinal direction) view of an illustrative example embodiment of a resin fuse 134 for detecting a loading in a resin seatback above a tolerance loading. The resin fuse 134 of FIG. 4A includes the indicator bar 140 extending across the diameter 142 of the aperture 136. A first half (i.e., the left side as shown in the drawings) of the indicator bar 140 tapers from a proximate edge 154 of the indicator bar 140 towards a mid-line 156 of the indicator bar 140, thereby decreasing in a vertical thickness 158 along this extension. This decreasing thickness is symmetrical across the mid-line 156 of the indicator bar. Accordingly, the width of this example embodiment is thinnest at the mid-line 156.

In some embodiments, the vertical thickness 158 of the resin fuse 134 may be engineered such that a strength of the indicator bar 140 against fracture is related to, based on, or indicative of a strength of another portion of the resin seat back 118 (i.e., the indicator bar 140 is "tuned"). For example, the strength of the indicator bar 140 may be indicative of a strength of the resin seat back 118 against forming microfractures in any portion of the resin seat back 118. That is, as load is applied to the resin seat back 118, a portion or all of the load may be transferred to the resin fuse 134 and the resin fuse 134 may indicate whether that load is above or below a loading tolerance of the resin seat back 118. If the load is below a loading tolerance, there will be no damage to the indicator bar 140 of the resin fuse 134. However, if the load is above the loading tolerance, the indicator bar 140 will fracture, break, or otherwise form some discontinuity, thus indicating that the resin seat back 118 has experienced loading above the loading tolerance. In some embodiments, the strength of the indicator bar 140 to resist fracture is related to the weakest component of the vehicle seat assembly 100 and/or the resin seat back 118 such that, if there is a discontinuity in the indicator bar 140, there may be a corresponding discontinuity in the weakest portion of the vehicle seat assembly 100 or the resin seat back 118.

With particular reference to FIG. 4A, arrow 160 indicates a load applied to a vehicle, such as the vehicle 10 depicted in FIG. 1. The load applied in FIG. 4A is from a left side of the vehicle. A counter load, indicated by arrow 162, is developed due to the static internal forces in the resin seat back 118. The load and the counter load create a compressive force on the indicator bar 140 compressing the indicator bar 140 along the diameter 142 of the resin fuse 134. The stress created by the compressive force gets progressively larger along the length of the indicator bar 140 from the proximate edge 154 toward the mid-line 156 due to the decreasing cross sectional area of the indicator bar 140 along this line. If the stress exceeds a fracture stress for the particular material making up the indicator bar 140 (e.g., PE), the indicator bar 140 will fracture. The fracture strength of the indicator bar 140 is calibrated to indicate a fracture strength of the resin seat back 118 as a whole by controlling the dimensions of the indicator bar 140.

Figure 6:
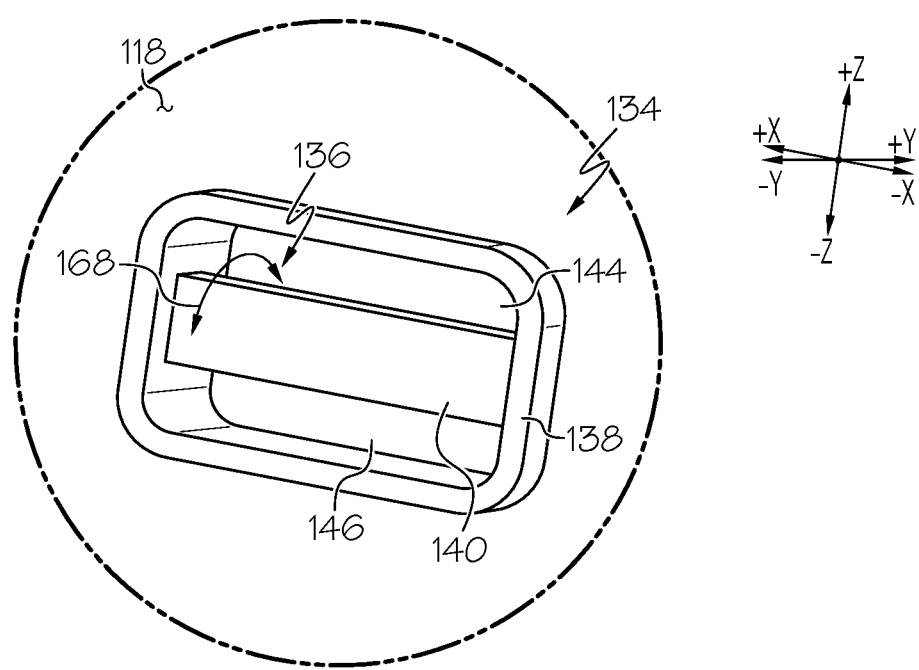
FIG. 6 depicts an illustrative resin fuse of the seat back of FIG. 2B in isolation, according to one or more embodiments shown and described herein.

Briefly referring to FIG. 6, the resin fuse 134 is shown subjected to a torsional load 168. The torsional load 168 may be developed in the resin fuse 134, for example, by applying a load to the resin seat back 118. For example, the resin seat back 118 may be bent or twisted during collision testing of the vehicle 10 of FIG. 1. The load may be transferred to the indicator bar 140 of the resin fuse 134 and may tend to twist the indicator bar 140. The torsional load 168 may result in an internal shear stress in one or more components of the resin fuse 134, for example, in the indicator bar 140. The indicator bar 140 may experience both an internal compression stress and an internal tensile stress as it twists. The torsional load capacity of the indicator bar 140 may be engineered such that if the maximum torsional load of the indicator bar 140 is exceeded (i.e., the indicator bar fractures due to the torsional load), the resin seat back 118 needs to be replaced. That is, a fracture in the indicator bar 140 may indicate loading condition in the resin seat back 118 above its design tolerance or some factor thereof. In addition to the particular design features shown in FIGS. 4A-4C, the resin fuse 134 may also include one or more features engineered to manipulate the torsional load strength of the indicator bar 140.

Figure 4B:
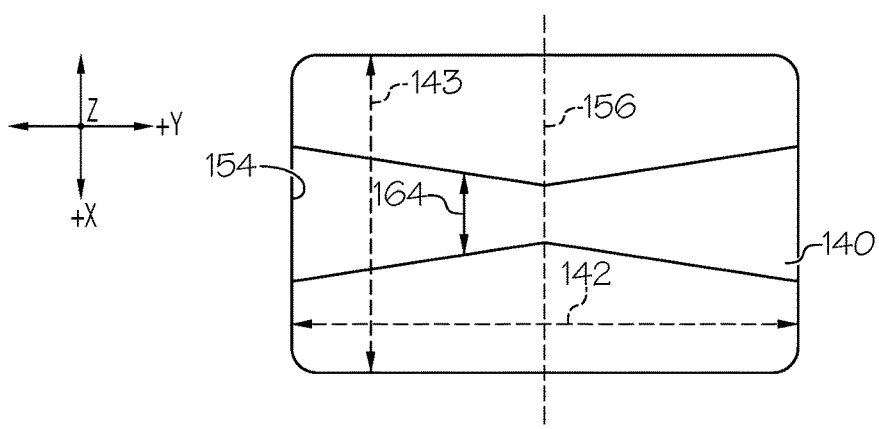
FIG. 4B depicts a top view of an embodiment of the resin fuse of FIG. 3, according to one or more embodiments shown and described herein.

FIG. 4B depicts a top view of another illustrative example embodiment of the resin fuse 134 including the indicator bar 140 for indicating loading above a tolerance loading. The indicator bar 140 of FIG. 4B extends the diameter 142 of the resin fuse 134 and a depth 143 of the resin fuse 134. A longitudinal thickness 164 decreases along the indicator bar 140 from the proximate edge 154 of the indicator bar 140 to the mid-line 156 of the indicator bar 140. More specifically, the longitudinal thickness 164 of the indicator bar 140 in the +/−X direction decreases from the left proximate edge 154 to the mid-line 156 of the indicator bar 140 along the length of the indicator bar 140 in the +Y direction. In the particular example embodiment depicted in FIG. 4B, this change in longitudinal thickness is mirrored on the opposite side of the mid-line 156 of the indicator bar 140, however, it is not necessary that the indicator bar 140 take this symmetrical shape and embodiments without a symmetrical shape are contemplated.

As with the example of the indicator bar 140 depicted in FIG. 4A, the internal stress felt by the indicator bar 140 increases as the cross sectional area of the indicator bar 140 decreases from the proximate edge 154 to the mid-line 156. Accordingly, the indicator bar 140 is more likely to fracture at the mid-line 156 given a constant stress.

Figure 4C:
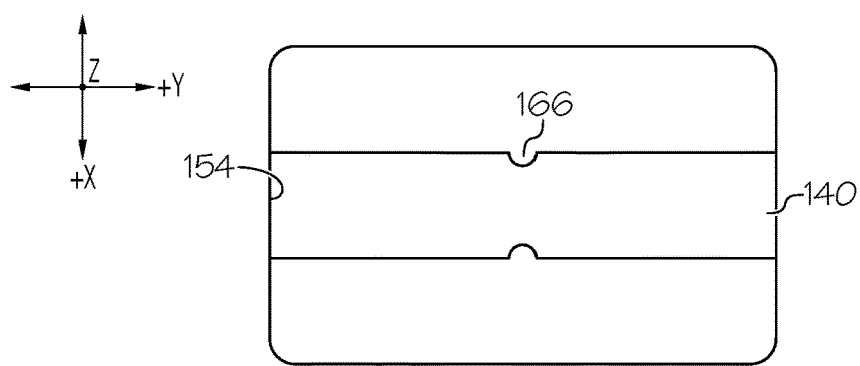
FIG. 4C depicts a top view of an embodiment of the resin fuse of FIG. 3, according to one or more embodiments shown and described herein.

FIG. 4C depicts a top view of another illustrative example embodiment of the resin fuse 134 including the indicator bar 140. The indicator bar 140 of FIG. 4c includes a strength-reduction feature 166. The strength-reduction feature 166 tunes the fracture strength of the indicator bar 140 to a predetermined value. As shown in FIG. 4C, the strength-reduction feature 166 is a semi-circular notch. The semi-circular notch reduces the cross sectional area of the indicator bar at the semi-circular notch and thus increases the stress at the location of the semi-circular notch as described above, making it more likely that if the indicator bar 140 fails, it will fail at the semi-circular notch. The dimensions of the semi-circular notch can be engineered per the specifications of the resin seat back 118.

While the particular embodiment shown includes a semi-circular notch, it is to be understood that any shape and size of strength-alteration feature can be used to alter the cross sectional area of the indicator bar 140. For example, the strength-reduction feature 166 could be a v-shaped or triangular notch, a rectangular notch, a perforation, a gap, or the like. In some embodiments, the strength alteration feature may increase the cross sectional area of one or more portions of the indicator bar 140, thereby making it less likely that the indicator bar will fail at the location of the strength-reduction feature 166. For example, the strength-alteration feature could include a bump, a protuberance, a bulge, or the like.

While the embodiments of the resin fuses have been described herein as being used in conjunction with a vehicle seatback, it should be understood that other embodiments are contemplated and possible. For example, resin fuses may be incorporated in other vehicle components to provide an indication that the loading tolerance of the component has been exceeded. In embodiments the vehicle components may be formed, for example, from a resin material and may include one or more resin fuses, as described herein. For example, and without limitation, one or more of the aspects of the resin fuse described above may be applied to a center console of the vehicle to indicate whether one or more components of the center console have experienced loading above the loading tolerance. As another non-limiting example, one or more aspects of the resin fuse described above may be applied to a structural pillar of the vehicle to indicate whether one or more components of the structural pillar have experienced loading above the loading tolerance.

Figure 5:
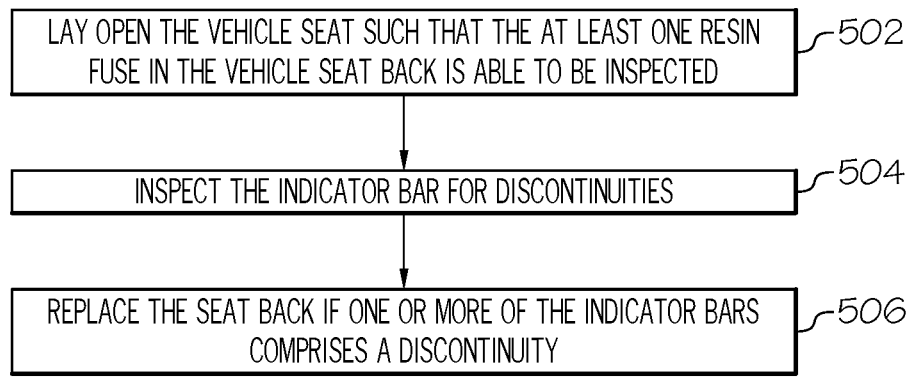
FIG. 5 depicts a method of inspecting a vehicle seat assembly to determine structural integrity of the vehicle seat assembly, according to one or more embodiments shown and described herein.

Referring now to FIG. 5, a method for inspecting a seat back with at least one resin fuse will be described. The method is recited with respect to inspecting a seat back and resin fuse similar to the seat back and resin fuse described above, but it is to be understood that the method could be used to inspect any type of vehicle seat having at least one resin fuse. For example, the vehicle seat could be a bucket seat with at least one resin fuse comprising an aperture extending through the seat back and a flange encircling the aperture and an indicator bar extending across a diameter of the aperture between two openings of the aperture. The method includes at least laying open the vehicle seat such that the at least one resin fuse in the vehicle seat back is able to be inspected and inspecting the indicator bar for discontinuities in the indicator bar.

With reference to the example method depicted in FIG. 5, at step 502, the vehicle seat is laid open such that at least one resin fuse in the vehicle seat back is able to be inspected. Laying open the vehicle seat may include any step, procedure, or process that results in the at least one resin fuse being able to be inspected. For example, without limitation, an exterior cover such as an upholstery cover, a padding, a cushion, and/or an external seat cover may be removed from the seat exposing the at least one resin fuse. In another embodiment, a device for inspecting the at least one resin fuse may be placed in the seat cover, upholstery, padding, or cushion such that the device can enable inspection of the at least one resin fuse without removing the cover, upholstery, padding, cushion, etc. For example, without limitation, a non-destructive technique may be applied to inspect the at least one resin fuse (e.g., the use of an endoscopic camera, an ultrasonic inspection, or x-ray topography).

Once the vehicle seat is laid open (e.g., the upholstery/padding is removed, and/or the inspection apparatus is in place), the at least one resin fuse may be inspected for discontinuities at step 504. This may include inspecting the at least one resin fuse for cracks, gaps, clefts, breaches, chinks, fissures, etc. For the purpose of this specification, such cracks, gaps, etc. will be referred to as discontinuities. Inspecting the at least one resin fuse may also include inspecting the resin fuse using one or more of a camera, an X-ray topography machine, an ultrasonic transducer, etc.

Still referring to the example method depicted in FIG. 5, the method of inspecting the vehicle seat may further include replacing the seat back if one or more of the resin fuses comprises a discontinuity at step 506. Replacing the seat back may include replacing the entire vehicle seat assembly or one or more portions thereof. For example, replacing the seat back may include decoupling the seat back from the seat frame and replacing only the seat back. The replacement seat back may include at least one resin fuse without a discontinuity. In embodiments of vehicles having multiple seat assemblies with seatbacks having one or more resin fuses, each of the vehicle seat assemblies and/or seatbacks may be replaced if any of the seatbacks includes a resin fuse with a discontinuity. Such a method may ensure that none of the vehicle seat assemblies includes a seat back that has experienced loading above a loading tolerance.

In some embodiments of the method of inspecting the vehicle seat, the indicator bar may comprise a strength-alteration feature. For example, and without limitation, the indicator bar may include one or more of a triangular notch, a semi-circular notch, a perforation, an aperture, and a gap as described above with respect to FIG. 4C. In yet other embodiments, the indicator bar may be integral and monolithic with the resin fuse.

It should now be understood that vehicles and vehicle components may include one or more resin fuses for indicating loading of the vehicle and/or the component above a loading tolerance. The resin fuse may include an indicator bar extending across a diameter of an aperture of the resin fuse. Failure of the indicator bar may provide a macroscopic indication of loading above a tolerance that might otherwise only be detectable on a microscopic scale (e.g., microfractures). Additionally, the resin fuse may be tuned to fail under particular loading conditions by controlling the material composition and/or including one or more structural features, thus providing a user an indication of a minimum experienced load. Accordingly, the resin fuse and indicator bar may be used to indicate the necessity for repairing or replacing one or more vehicle components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle seat assembly comprising:
   a seat frame assembly including a seat base and a seat back pivotally connected to the seat base, the seat back comprising at least one resin fuse arranged in the seat back to indicate structural loading in the vehicle seat assembly above a tolerance loading, wherein the at least one resin fuse comprises:
      an aperture extending through the seat back and comprising a flange encircling the aperture and extending generally perpendicular to the seat back; and
      an indicator bar extending across a diameter of the aperture, wherein the aperture is open on either side of the indicator bar.

2. The vehicle seat assembly of claim 1, wherein the seat back comprises a resin seat back.

3. The vehicle seat assembly of claim 2, wherein the indicator bar comprises the same material as the resin seat back.

4. The vehicle seat assembly of claim 1, wherein the seat back comprises a resin seat back and the at least one resin fuse is formed integrally with the resin seat back.

5. The vehicle seat assembly of claim 1, wherein the seat back comprises at least one resin fuse arranged in a vehicle-horizontal orientation, and at least one resin fuse arranged in a vehicle-vertical orientation.

6. The vehicle seat assembly of claim 1, wherein the seat back is pivotally connected to the seat base at a recline mechanism.

7. The vehicle seat assembly of claim 1, wherein a vertical thickness of the indicator bar is greater at a proximate edge of the indicator bar than at a mid-line of the indicator bar.

8. The vehicle seat assembly of claim 1, wherein a longitudinal thickness of the indicator bar decreases from an edge of the aperture to a mid-line of the indicator bar.

9. The vehicle seat assembly of claim 1, wherein the indicator bar comprises a strength-alteration feature.

10. A vehicle including a vehicle seat assembly, the vehicle seat assembly comprising:
    a seat back comprising at least one resin fuse arranged in the seat back to indicate structural loading in the vehicle seat assembly above a tolerance loading, wherein the at least one resin fuse comprises:
       an aperture extending through the seat back and comprising a flange encircling the aperture and extending generally perpendicular to the seat back; and
       an indicator bar extending across a diameter of the aperture, wherein the aperture is open on either side of the indicator bar.

11. The vehicle of claim 10, wherein the seat back comprises a resin seat back.

12. The vehicle of claim 10, wherein the seat back comprises a resin seat back and the at least one resin fuse is formed integrally with the resin seat back.

13. The vehicle of claim 10, wherein the seat back comprises at least one resin fuse arranged in a vehicle-horizontal orientation, and at least one resin fuse arranged in a vehicle-vertical orientation.

14. The vehicle of claim 10, wherein a vertical thickness of the indicator bar is greater at a proximate edge of the indicator bar than at a mid-line of the indicator bar.

15. The vehicle of claim 10, wherein a longitudinal thickness of the indicator bar decreases from an edge of the aperture to a mid-line of the indicator bar.

16. The vehicle of claim 10, wherein the indicator bar comprises a strength-alteration feature.

17. The vehicle of claim 16, wherein the strength-alteration feature is one or more of a triangular notch, a semi-circular notch, a perforation, an aperture, and a gap.

18. A method of inspecting a vehicle seat that comprises a seat back with at least one resin fuse comprising an aperture extending through the seat back encircled by a flange and an indicator bar extending across a diameter of the aperture between two openings of the aperture, the method comprising:
    laying open the vehicle seat such that the at least one resin fuse in the vehicle seat back is able to be inspected; and
    inspecting the indicator bar for discontinuities in the indicator bar.

19. The method of claim 18, wherein the indicator bar comprises a strength-alteration feature.

20. The method of claim 18, further comprising replacing the seat back if one or more of the resin fuses comprises a discontinuity.

* * * * *